United States Patent Office 3,794,657
Patented Feb. 26, 1974

3,794,657
2 - (3' - TRIFLUOROMETHYLTHIO-ANILINO)-NICO-TINIC ACID, ESTERS THEREOF AND PHARMACEUTICALLY ACCEPTABLE INORGANIC OR BASIC SALTS THEREOF
Henry Najer and Jean-Francois Giudicelli, Paris, France, assignors to Synthelabo, Paris, France
No Drawing. Continuation-in-part of application Ser. No. 272,140, July 17, 1972. This application Sept. 29, 1972, Ser. No. 293,547
Claims priority, application France, July 15, 1971, 7125859; Sept. 30, 1971 7135155, 7135156
Int. Cl. C07d 31/50
U.S. Cl. 260—294.8 G                    5 Claims

ABSTRACT OF THE DISCLOSURE 2-(3'-trifluoromethylthio-anilino)nicotinic acid and its salts and esters have useful anti-inflammatory analgesic and antipyretic properties.

---

This application is a continuation-in-part of our copending application Ser. No. 272,140 filed July 17, 1972 under the title "Pyridine Derivatives."

The present invention provides 2-(3'-trifluoromethylthio-anilino)-nicotinic acid and its esters, that is to say the compounds of the formula:

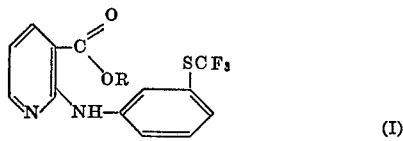

(I)

in which R represents a hydrogen atom or a straight or branched chain alkyl radical of one to six carbon atoms, or a 2,3-dihydroxy-n-propyl radical and their salts with pharmaceutically acceptable inorganic acids (e.g. hydrochloric or sulphuric acid) or organic acids (e.g. acetic, tartaric or citric acid) and the salts which the compound in which R=H forms with any pharmaceutically acceptable base, which may be inorganic (e.g. sodium hydroxide or potassium hydroxide) or organic (e.g. diethanolamine, diethylamine, pyridoxine, glucosamine, N-methyl-piperazine, or N-(3-chloro-phenyl)-piperazine).

The compounds of Formula I are prepared by reacting m-trifluoro-methylthio-aniline, in an aromatic hydrocarbon such as xylene, with a halogenated compound of the formula:

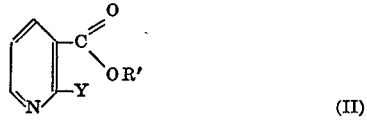

(II)

in which R' has the same meaning as in the General Formula I except that when a product in which R=2,3-dihydroxy-n-propyl is desired, the hydroxy groups are protected initially so that R' in Formula II represents an isopropylidene-2,3-dioxy-n-propyl radical and X represents either a bromine atom or a chlorine atom.

The reaction takes place at the reflux temperature of the solvent which is maintained until the starting materials have dissolved completely, that is to say for about 3 to 5 hours.

To prepare the compounds of the General Formula I in which R is an alkyl radical containing 1 to 6 carbon atoms, it is advantageous to react one mole of an alkyl 2-chloro-nicotinate with two mols of m-trifluoromethylthio-aniline, because m-trifluoromethylthio-aniline at the same time plays the role of an acceptor for hydrochloric acid.

The reaction is carried out by heating the reaction mixture to a temperature of about 200° C. for about 10 minutes.

Particularly when a compound in which R is 2,3-dihydroxy-n-propyl is desired, the reaction may be carried out in an acidic medium, preferably in the presence of water, and under a stream of nitrogen at the reflux temperature with stirring. A reaction time of about 2 hours is usually sufficient.

A variant of the process according to the invention makes it possible to obtain the compound of the General Formula I in which R=H; this consists of preparing a compound of the General Formula I in which R is an alkyl radical and then hydrolyzing it with an alkaline or acid reagent.

It is also possible to prepare the Compounds I by means of starting materials other than those indicated, but which behave in an equivalent manner. For example, instead of using a halogen derivative (II) it is possible to use a nicotinic acid (or a corresponding ester) which in the 2-position carries an alkoxy, alkylthio, alkylsulphonyl or nitro substituent or any other substituent having an equivalent effect. In all these cases, the same reaction conditions are employed as in the nucleophilic displacement reaction according to the process.

The Compounds I prepared according to the above techniques are generally crystalline water-insoluble substances.

The salts of the Compounds I are prepared by the generally known methods.

Finally, the invention comprises the industrial applications of the Compounds I and more particularly their use as medicines. The Compounds I in effect possess pharmacological properties which make them valuable in therapy.

The examples which follow illustrate the invention.

EXAMPLE 1

Methyl 2-(3'-trifluoromethylthio-anilino)-nicotinate

A mixture of 13.3 g. (0.077 mol/g.) of methyl 2-chloronicotinate and of 29.9 g. (0.155 mol/g.) of m-trifluoromethylthioaniline is heated for 10 minutes at 200–210° C. in a 100 ml. flask equipped with a condenser. The reaction mixture is allowed to cool and poured into 200 ml. of ether, the m-trifluoromethylthio-aniline hydrochloride which precipitates is filtered off, the ether is driven off the filtrate and the residue is triturated in 100 ml. of hexane. About 1.5 g. of a precipitate consisting of 2-chloro-nicotinic acid are filtered off and the hexane is driven from the filtrate on a water bath, in vacuo. The oily residue is rectified.

19.5 g. (yield=78%) of methyl 2-(3'-trifluoromethylthio-anilino)-nicotinate are thus collected in the form of a slightly yellow oil which passes over at 178–180° C./0.1 mm. and solidifies in the receiver flask. Melting point= 50–52° C.

Analysis.—$C_{14}H_{11}F_3N_2O_2S$ (328): Calculated (percent): C, 51.57; H, 3.35; F, 17.45; N, 8.53; $OCH_3$, 9.45. Found (percent): C, 51.51, 51.56; H, 3.48, 3.48; F, 17.40; N, 8.60; $OCH_3$, 9.47.

EXAMPLE 2

Ethyl 2-(3'-trifluoromethylthio-anilino)-nicotinate

A mixture of 14.9 g. (0.08 mol/g.) of ethyl 2-chloro-nicotinate and 31.1 g. (0.16 mol/g.) of m-trifluoromethylthio-aniline is heated for 10 minutes at 200–210° C. in a 100 ml. flask. The mixture is allowed to cool, 200 ml. of ether are added, the m-trifluoromethylthio-aniline hydrochloride which has precipitated is filtered off, the ether is driven from the filtrate and the residue is rectified.

25.1 g. (yield=91%) of ethyl 2-(3'-trifluoromethylthio-anilino)-nicotinate are thus collected in the form of an oil passing over at 164° C./0.5 mm. and solidifying in the receiver flask. Melting point=62–64° C.

Analysis.—$C_{15}H_{13}F_3N_2O_2S$ (342: Calculated (percent): C, 52.63; H, 3.81; F, 16.40; N, 7.88. Found (percent): C, 52.68, 52.78; H, 3.74, 3.69; F, 16.10, 15.85; N, 8.01, 8.10.

All the other esters of 2-(3'-trifluoromethylthio-anilino)-nicotinic acid corresponding to the General Formula I are prepared by reacting the appropriate alkyl 2-chloronicotinates with m-trifluoromethylthio-aniline

EXAMPLE 3

2-(3'-trifluoromethylthio-anilino)-nicotinic acid 6.3 g. (0.04 mol/g.) of 2-chloro-nicotinic acid and 7.7 g. (0.04 mol/g.) of m-trifluoromethylthio-aniline in 40 ml. of xylene are mixed in a 100 ml. two-neck flask equipped with a mechanical stirrer and a reflux condenser surmounted by a calcium chloride guard tube. This mixture is heated to the reflux temperature of the xylene for three hours (the starting materials dissolve completely) and is cooled, and the product which has precipitated is filtered off, successively washed with xylene and then with petroleum ether, and dried in vacuo.

10.2 g. (yield=81%) of 2-(3'-trifluoromethylthio-anilino)-nicotinic acid are thus collected; after recrystallization from methyl alcohol this acid is in the form of a light yellow crystalline compound which is insoluble in water and soluble in sodium bicarbonate and melts at 173–175°.

Analysis.—$C_{13}H_9F_3N_2O_2S$ (314: Calculated (percent): C, 49.68; H, 2.87; N, 8.92; F, 18.15. Found (percent): C, 49.47, 49.51; H, 3.00, 2.98; N, 839, 8.40; F, 18.38, 18.32.

EXAMPLE 4

17.5 g. (0.063 mol/g.) of isopropylidene-2,3-dioxy-propyl 2'-chloro-nicotinate, 140 ml. of water and 20 ml. of concentrated hydrochloric acid are introduced into a 500 ml. three-necked flask equipped with a condenser, a mechanical stirrer and a bubble tube. This mixture is heated at the reflux temperature for one hour, whilst stirring under a stream of nitrogen. 38.6 g. (0.2 mol/g.) of m-trifluoromethylthio-aniline are then added and the reaction is completed by heating at the reflux temperature for one hour under a stream of nitrogen. The solution is filtered, while hot, through animal or vegetable charcoal and chilled; m-trifluoromethylthio-aniline hydrochloride which has precipitated is filtered off and the filtrate is rendered alkaline by addition of 20% ammonia solution. The oil separates out and is extracted with diethyl ether and the ether extract is dried over sodium sulphate; the solution is then filtered, the ether is evaporated off and 200 ml. of xylene are added to the residual paste. The mixture is chilled for several hours and the crystals which have separated are filtered off and recrystallized from toluene.

7 g. (yield=29%) of 2,3-dihydroxy-propyl 2'-(3''-trifluoromethylthio-anilino)-nicotinate are obtained, M.P. 102° C.

Analysis.—$C_{16}H_{15}F_3N_2O_4S$ (388): Calculated (percent): C, 49.50; H, 3.86; F, 14.75; N, 7.21. Found (percent): C, 49.54, 49.41; H, 3.95, 4.07; F, 14.50, 14.57; N, 7.15, 7.18.

After recrystallization from an ethyl acetate/alcohol mixture, (9:1 by volume) the 2,3-dihydroxy-propyl 2'-(3''-trifluoromethylthio-anilino)-nicotinate hydrochloride melts at 165° C.

Analysis.—$C_{16}H_{16}F_3ClN_2O_4S$ (424.5): Calculated (percent): C, 45.27; H, 3.80; Cl, 8.36; F, 13.42; N, 6.60. Found (percent): C, 44.73, 44.71; H, 3.88, 3.96; Cl, 8.42, 8.38; F, 13.58, 13.45; N, 6.43, 6.43.

The compounds of the invention were subjected to pharmacological tests demonstrating their anti-inflammatory, analgesic and antipyretic properties.

The results of some tests carried out with 2-(3'-trifluoromethylthio - anilino) - nicotinic acid, hereafter referred to as "Compound A" are given by way of an example.

(1) Anti-inflammatory activity (a) Test of the carraghenine-provoked oedema in the paw of a rat. The technique used is that described by C. A. Winter in "Non-Steroidal Anti-Inflammatory Drugs, International Congress Series 81," Excerpta Medica Foundation 1965, pp. 190–202. 2-(3'-trifluoromethyl-anilino-nicotinic acid (or niflumic acid), hereafter referred to as "Compound N" was taken as the reference compound. The results are summarized in the table which follows.

| Dose (mg./kg.) | Time after injection of the carraghenine (hrs.) | Percentage inhibition of the oedema after oral administration of the compound— | |
|---|---|---|---|
| | | A | N |
| 9 | 3 | 33 | 18 |
| | 5 | 32 | 18 |
| 27 | 3 | 58 | 44 |
| | 5 | 49 | 36 |
| 81 | 3 | 65 | 56 |
| | 5 | 48 | 37 |

Thus Compound A is always more active than Compound N. The difference in activity, which is very great at the low dose of 9 mg./kg., very significantly demonstrates the greater anti-inflammatory activity of A. The difference in activity between A and N is less at the strong doses because in the test used the anti-inflammatory effect reaches a "ceiling" generally at about 55–65 percent and virtually increases no further if the dose administered is increased further.

(b) UV-ray erythema test. The technique is that described by Wilhelmi (Schweiz. med. Wschr., 1949, 79, 577) modified by S. S. Adams (The Journal of Pharmacy and Pharmacology, 1960, 12, p. 251–252).

The compounds are administered at a dose of 27 mg./kg. (given orally). The results are summarized in the table below.

| Time after irradiation by U.V.-rays (hrs.) | Percentage inhibition of the erythema after administration of the compounds | |
|---|---|---|
| | A | N |
| 2 | 77 | 61.5 |
| 18 | 50 | 21.5 |

(2) Analgesic activity (a) Writhing test (L. O. Hendershot and J. Forsaith, J. Pharmacol. Exp. Ther. 1959, 125, p. 237) in mice.

The compounds are administered orally at a dose of 75 mg./kg. The results are shown in the table below.

| Compounds: | Percentage inhibition of the contortions caused by 2-phenyl-1,4-benzoquinone |
|---|---|
| — (comparison batch) | 0 |
| A | 60 |
| N | 40 |

(b) Randall and Selitto test (L. O. Randall and J. J. Selitto, Arch. int. Pharm., 1957, 111, p. 409–418).

The compounds are administered orally at doses of 27 and 81 mg./kg.

The results are summarized in the table below.

As in the case of the test of the carraghenine-provoked oedema of the paw of a rat, the difference in activity between the Compound A and the Compound N is much greater at a low dose than at a high dose because of the effect reaching a ceiling.

| Dose (mg./kg.) | Time after injection of brewers' yeast (hrs.) | Percentage rise in the pain threshold caused by the compounds (relative to a reference batch) | |
|---|---|---|---|
| | | A | N |
| 27 | 1.5 | 114 | 58 |
| | 3 | 192 | 94 |
| | 4.5 | 148 | 74 |
| 81 | 1.5 | 174 | 146 |
| | 3 | 200 | 168 |
| | 4.5 | 230 | 150 |

(3) Antipyretic activity

Hyperthermy is induced in rats by subcutaneous injection of brewers' yeast. When the rectal temperature is above 38.5°, the Compounds A and N are administered orally at a dose of 150 mg./kg. and the rectal temperature is recorded 1, 2, 3, 4, 5, 6 and 7 hours afterwards. The details of the results are shown below.

| Compounds | After brewers' yeast, degrees | Average temperature after administration of the compounds (degrees) | | | | | | |
|---|---|---|---|---|---|---|---|---|
| | | 1 hr. | 2 hrs. | 3 hrs. | 4 hrs. | 5 hrs. | 6 hrs. | 7 hrs. |
| Comparison | 38.6 | 38.7 | 38.8 | 38.8 | 39 | 38.9 | 38.9 | 38.8 |
| A | 38.6 | 37.7 | 37.2 | 37.4 | 37.3 | 37.4 | 37.2 | 37.3 |
| N | 38.5 | 38 | 37.9 | 37.5 | 37.4 | 37.5 | 37.5 | 37.5 |

Throughout the experiment, the antipyretic activity of A is greater than that of the Compound N.

(4) Therapeutic index

Compound A administered orally to mice has the same toxicity as Compound N. The LD 50 of these two substances, which are respectively 465 (95% confidence limits: 385–565) and 500 (400–625) do not significantly differ statistically. However, because of its greater activity, the Compound A has a more favorable therapeutic index than the Compound N.

The esters described in Examples 1 and 2 possess the same properties as the Compound A of Example 3. Furthermore, they are better tolerated by the gastric mucous membrane.

The compound described in Example 4 above also possesses pharmacological properties which are valuable in therapy. It has a low toxicity (LD 50 when administered orally to mice: 610 (95% confidence limits: 490–725) mg./kg.), and it possesses anti-inflammatory and anti-pyretic properties which are at least as powerful as those of 2-(3'-trifluoromethylthio-anilino)-nicotinic acid and its methyl and ethyl esters but is approximately three times more powerful against anti-inflammatory pain (L. O. Randall and J. J. Selitto test, Arch. int. Pharm., 1957, 111, pp. 409–418) than the last mentioned acid and methyl and ethyl ester.

The table below gives the averages of the results of three experiments carried out with the Example 4 compound and with 2-(3'-trifluoromethylthio-anilino)-nicotinic acid (Compound A).

| Doses (mg./kg.) | Percentage increase in threshold of pain caused by the compounds (relative to a control batch) [1] | |
|---|---|---|
| | Example 4 compound | Compound A |
| 9 | 150 | 60 |
| 27 | 310 | 147 |

[1] Measurements made 3 hours after the injection of beer yeast.

This table shows that the Example 4 compound, at a dose of 9 mg./kg., exerts an effect which is substantially equal to that achieved after the administration of 27 mg./kg. of Compound A.

In therapy, the Compounds I and their salts are preferably administered either orally or rectally.

The invention therefore comprises all pharmaceutical compositions which contain one of the Compounds I as the active principal in combination with excipients suitable for their oral and rectal administration. These pharmaceutical compositions can also contain other medicinal substances with which the Compounds I are pharmaceutically and therapeutically compatible.

For oral use, the solid or liquid pharmaceutical forms appropriate for this type of administration are employed, that is to say gelatine-coated pills, tablets, dragees and the like, and the unit dose can vary, depending on the chosen Compound I, between 50 and 500 mg. of active principal (1–500 mg. when R=2,3-dihydroxy-n-propyl-) whilst the daily dose can vary between 200 and 2000 mg., (1–2000 mg. when R=2, 3-dihydroxy-n-propyl).

For rectal use, suppositories are employed which each contain, depending on the chosen Compound I, 100 to 500 mg. of active principal (1–300 mg. when R=2,3-dihydroxy-n-propyl), the daily posology being two to three suppositories.

We claim:

1. A compound of the formula

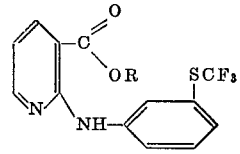

in which R represents a hydrogen atom or a straight or branched chain alkyl radical of one to six carbon atoms, or a 2,3-dihydroxy-n-propyl radical, its salts with any pharmaceutically acceptable inorganic acid, and the salts which the compound in which R=H forms with any pharmaceutically acceptable base.

2. The compound of claim 1 in which R represents a hydrogen atom or an alkyl radical.

3. The compound of claim 1 in which R represents a 2,3-dihydroxy-n-propyl radical.

4. 2-(3'-trifluoromethyl-thio-anilino)-nicotinic acid.

5. 2',3'-dihydroxy-n-propyl-2-(3'-trifluoromethyl - thioanilino)-nicotinate.

References Cited

UNITED STATES PATENTS

| 3,337,570 | 8/1967 | Sherlock et al. | 260—295.5 R |
| 3,415,834 | 12/1968 | Hoffmann et al. | 260—295.5 R |
| 3,697,533 | 10/1972 | Sherlock | 260—295.5 R |

FOREIGN PATENTS

| 7,472 | 1/1970 | France | 260—295.5 R |

ALAN L. ROTMAN, Primary Examiner

U.S. Cl. X.R.

260—211 R, 268 H, 294.8 F, 295.5 R; 424—266, 250